UNITED STATES PATENT OFFICE.

THOMAS E. MURRAY, JR., OF BROOKLYN, NEW YORK.

METHOD OF ELECTRIC WELDING.

1,281,637.  Specification of Letters Patent.  Patented Oct. 15, 1918.

No Drawing.   Application filed February 6, 1918.  Serial No. 215,711.

*To all whom it may concern:*

Be it known that I, THOMAS E. MURRAY, Jr., a citizen of the United States, residing at Brooklyn, in the county of Kings and State of New York, have invented a certain new and useful Improvement in Methods of Electric Welding, of which the following is a specification.

In another application for Letters Patent, Serial No. 215,710, filed Feb. 6, 1918, I have set forth the improvement in the art of electric welding which consists in subjecting the bodies to be united to a current of extremely high ampere strength and of very brief duration, whereby said bodies are caused to form a single homogeneous body without solution of continuity, the strength of which is equal to that of an unwelded body of like material and dimensions.

I have found that while retaining the same contact area at the welding faces of said bodies, if the shape of that area be changed, as hereinafter set forth, a difficulty ensues, which is overcome by my present invention.

This difficulty was revealed by the fact that when the shape of the contact area was changed so that instead of being that of a circle, rectangle or other figure of uniform length and width, it became one in which one dimension was greater than the other, and especially when the difference in said dimensions was large, a current of a given ampere strength was not as efficient in making a perfect union of the two bodies in one case as in the other. To illustrate, if the shape was changed from a square to a parallelogram in which the width was very much less than the length (as, for example, in changing from butt-welding the ends of two bars, each of an area of one square inch, to uniting the edges of two sheets of metal say $\frac{1}{4}$ inch in thickness and of a length sufficient to render the surface area one square inch) the welding was less effective in the second case than in the first. I have now discovered that by simply increasing the ampere strength of the welding current I can overcome this difficulty. That is to say, if a current of given high ampere strength will produce a perfect union when the contact area is a square or other regular figure of uniform dimensions, the same result may be obtained when the figure is changed to one in which the dimensions widely differ by increasing the current strength. All that is necessary for a given shape is to go on increasing the current strength until the perfect union is produced. After that, with unchanged conditions as to shape, material, etc., the welding of like bodies may be repeated indefinitely. I have found in one actual instance, where the contact area was a square, each side being 4.46 inches in length, a current of 5000 amperes per square inch produced perfect union. With a contact area in the form of a parallelogram 35 inches long by $\frac{9}{32}$ inch wide, the same result was obtained with a current of 30,000 amperes per square inch. One practical application of this invention will be obvious when it is stated that I am now welding the edges of steel plates of the thickness and length first above noted, and producing the same perfect union as between the butt ends of steel bars of the dimensions last given.

I claim:

The method of electrically welding bodies whereof the contact area is one in which the length is greater than the width, which consists in subjecting said bodies to a current of extremely high ampere strength and very brief duration to cause said bodies to form a single homogeneous body without solution of continuity, and of a strength equal to that of an unwelded body of like material and dimensions, the said ampere strength being greater than the ampere strength necessary to accomplish the same result in welding two bodies of identical material whereof the length of the contact area is equal to the width thereof.

In testimony whereof I have affixed my signature in presence of two witnesses.

THOMAS E. MURRAY, JR.

Witnesses:
 GERTRUDE T. PORTER,
 MAY T. MCGARRY.